(12) United States Patent
Kim et al.

(10) Patent No.: US 7,895,762 B2
(45) Date of Patent: *Mar. 1, 2011

(54) DIGITAL DEPTH GAUGE

(75) Inventors: John Y.S. Kim, Chicago, IL (US); Artur Kaganovsky, Wheeling, IL (US)

(73) Assignee: Eidosmed LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/605,571

(22) Filed: Oct. 26, 2009

(65) Prior Publication Data

US 2010/0137874 A1 Jun. 3, 2010

Related U.S. Application Data

(63) Continuation of application No. 11/593,885, filed on Nov. 7, 2006, now Pat. No. 7,607,238.

(51) Int. Cl.
*A61B 5/107* (2006.01)

(52) U.S. Cl. .......................... 33/512; 33/836; 606/102

(58) Field of Classification Search .................... 33/512, 33/836; 600/587; 606/102; 702/166
See application file for complete search history.

(56) References Cited

U.S. PATENT DOCUMENTS

| 1,526,418 | A | 2/1925 | Gronner |
| 3,916,529 | A | 11/1975 | Mousseau |
| 3,943,914 | A | 3/1976 | Grenfell et al. |
| 4,005,527 | A | 2/1977 | Wilson et al. |
| 4,033,043 | A | 7/1977 | Cunningham |
| 4,224,951 | A | 9/1980 | Hasson |
| 4,432,376 | A | 2/1984 | Huszar |
| 4,708,647 | A | 11/1987 | Pippin et al. |
| 4,845,646 | A | 7/1989 | Marquis et al. |
| 5,013,318 | A | 5/1991 | Spranza, III |
| 5,212,871 | A | 5/1993 | Luccarelli |
| 5,801,762 | A | 9/1998 | Dianna et al. |
| 6,145,509 | A | 11/2000 | Tanner |
| 6,494,848 | B1 | 12/2002 | Sommercorn et al. |
| 6,665,948 | B1 | 12/2003 | Kozin et al. |
| 6,729,037 | B2 | 5/2004 | White |

(Continued)

FOREIGN PATENT DOCUMENTS

WO    WO 00/78258 A1    12/2000

(Continued)

*Primary Examiner*—G. Bradley Bennett
(74) *Attorney, Agent, or Firm*—Drinker Biddle & Reath LLP (57) ABSTRACT

A digital depth gauge is provided for measuring a depth of a hole in an object. In one embodiment the gauge includes: a user interface with a display and at least one actuator; a reader shaft with a distal end and a proximal end connected to the user interface; a probe that extends from the distal end of the reader shaft and which includes a tip configured to locate a distal surface of the hole; a sleeve member with a distal end configured to abut a proximal surface of the hole, the sleeve member being coupled with the reader shaft for relative translational and rotational movement; and a sensor interposed between the reader shaft and the sleeve member for measuring relative translational movement between the reader shaft and the sleeve member. In some embodiments, the gauge may include a means for aligning elements of the sensor.

15 Claims, 5 Drawing Sheets

U.S. PATENT DOCUMENTS

| | | | |
|---|---|---|---|
| 6,811,557 B2 | 11/2004 | Schraga | |
| 7,025,774 B2 | 4/2006 | Freeman et al. | |
| 7,165,336 B2 | 1/2007 | Kim | |
| 7,607,238 B2 * | 10/2009 | Kim et al. | 33/512 |
| 2002/0104230 A1 | 8/2002 | White | |
| 2002/0156530 A1 | 10/2002 | Lambrecht et al. | |
| 2003/0047009 A1 | 3/2003 | Webb | |
| 2005/0066535 A1 | 3/2005 | Rupp et al. | |
| 2006/0041241 A1 | 2/2006 | Herndon | |
| 2006/0207119 A1 | 9/2006 | Kim et al. | |
| 2006/0224161 A1 | 10/2006 | Bhattacharyya | |
| 2009/0049705 A1 | 2/2009 | Kim | |

FOREIGN PATENT DOCUMENTS

| | | | |
|---|---|---|---|
| WO | WO 2005/027745 A1 | 3/2005 |

* cited by examiner

DIGITAL DEPTH GAUGE

FIELD OF THE INVENTION

This invention relates generally to measuring apparatuses and more particularly to a digital measuring device that is configured to measure a length or depth of a hole or bore in an object (e.g., a bone).

BACKGROUND OF THE INVENTION

Many surgical procedures require surgeons to secure a device to the bone of a patient. In some procedures, the surgeon spans and secures one or more bones, or pieces of bone, using a bone plate and screws or other fasteners. In other procedures, the surgeon uses a screw or other fastener without another device, for example, to secure a transplanted tendon. In many procedures, the surgeon drills a hole in the bone prior to securing the fastener to the bone. With a hole in place, the surgeon can more easily select a fastener of the appropriate length. Selection of an appropriate length fastener may be important in some instances to avoid complications because, as can be appreciated, if the fastener is too long, the fastener may protrude from the bone and harm adjacent soft tissues.

During drilling, the surgeon is typically capable of feeling when the drill has penetrated through the bone from a drop in resistance of the drill against the bone. Because drilling does not provide an exact measurement of the depth of the bone, surgeons sometimes use a conventional analog depth gauge to measure the depth of the hole. Example conventional analog depth gauges are available from gSource, LLC of Emerson, N.J., Synthes Inc. of West Chester, Pa. and other medical instrument companies.

Analog depth gauges are configured with a graduated scale (in units of inches or millimeters) along a portion of its length. To use an analog depth gauge for measuring the depth of a hole in a bone, the surgeon typically: inserts a probe member into the hole; extends the probe member beyond the distal side of the hole; retracts the probe member to "find purchase" against the distal side of the hole with a barb or hook of the probe; and abuts a movable marker against the proximal side of the hole to indicate a position along the graduated scale that gives the length or depth measurement.

In some instances, surgeons find it difficult to obtain an accurate measurement using such analog depth gauges. In one situation, the scale may be difficult to read under bright operating room lights. In another situation, the surgeon may not be positioned or aligned with the graduated scale to have an undistorted view. To address the foregoing problems, digital surgical depth instruments have been developed. Example digital surgical depth instruments are disclosed in commonly-assigned U.S. patent application Ser. Nos. 11/081,147 and 11/376,399, which are incorporated by reference herein. While such digital surgical depth instruments are useful for measuring depths of holes in bones which are in relatively shallow surgical fields, such instruments may be difficult to use when attempting to address bone measurement issues of the spine, hip, pelvis or other deep areas. Some embodiments of surgical depth instruments of the forgoing-mentioned patent applications use a digital display that moves with the probe—that is, the display moves away from the user as the probe is extended through the bone. Thus, when the surgeon must work within a body space that is deep and sufficiently constraining, it can be appreciated that such digital surgical depth instruments may be awkward to position and obtain readings from because the display may be oriented inside the deep surgical field, distal from the surgeon.

In view of the foregoing, a new depth gauge with a proximally-oriented and generally stationary user interface would be an important improvement in the art to, for example facilitate making measurements of depths of holes in bones, tissues, etc. in deep surgical fields.

BRIEF SUMMARY OF THE INVENTION

A digital depth gauge is provided for measuring a depth or length of a hole or bore in an object such as, for example a bone. In one embodiment the gauge includes: a proximally-oriented and generally stationary user interface portion including a display and at least one actuator; a reader shaft including a distal end and a proximal end connected to the user interface portion; a probe that extends from the distal end of the reader shaft and which includes a tip configured to locate a distal surface of the hole; a sleeve member including a distal end configured to abut a proximal surface of the hole, the sleeve member being coupled with the reader shaft for relative translational and rotational movement; and a sensor interposed between the reader shaft and the sleeve member for measuring relative translational movement between the reader shaft and the sleeve member. In some embodiments, the gauge may include a means for aligning elements of the sensor.

DETAILED DESCRIPTION

Referring now to the Figures an embodiment of a digital spinal depth gauge is provided. The embodiment may be employed for various applications where it is desired to determine an accurate length or depth of a hole or bore in an object. One such application is, for example, a medical procedure where a surgeon needs to drill a hole through one or more bones, or pieces of bone, and select a screw, pin or other fastener known in the art for insertion through the hole such that the bone or bones may be connected, fused or otherwise repaired. In one embodiment, because the user interface portion is proximally-oriented and generally stationary during the process of using the gauge to take a measurement, use of the gauge is particularly advantageous for measuring depths of bones in relatively deep surgical fields, such as when attempting to address bone measurement issues of the spine, hip, pelvis or other areas. Although one embodiment of the gauge may be advantageous for the foregoing-mentioned deep surgical field application, gauges in accordance with the present invention should not be construed as being limited to such applications.

Figure 1:
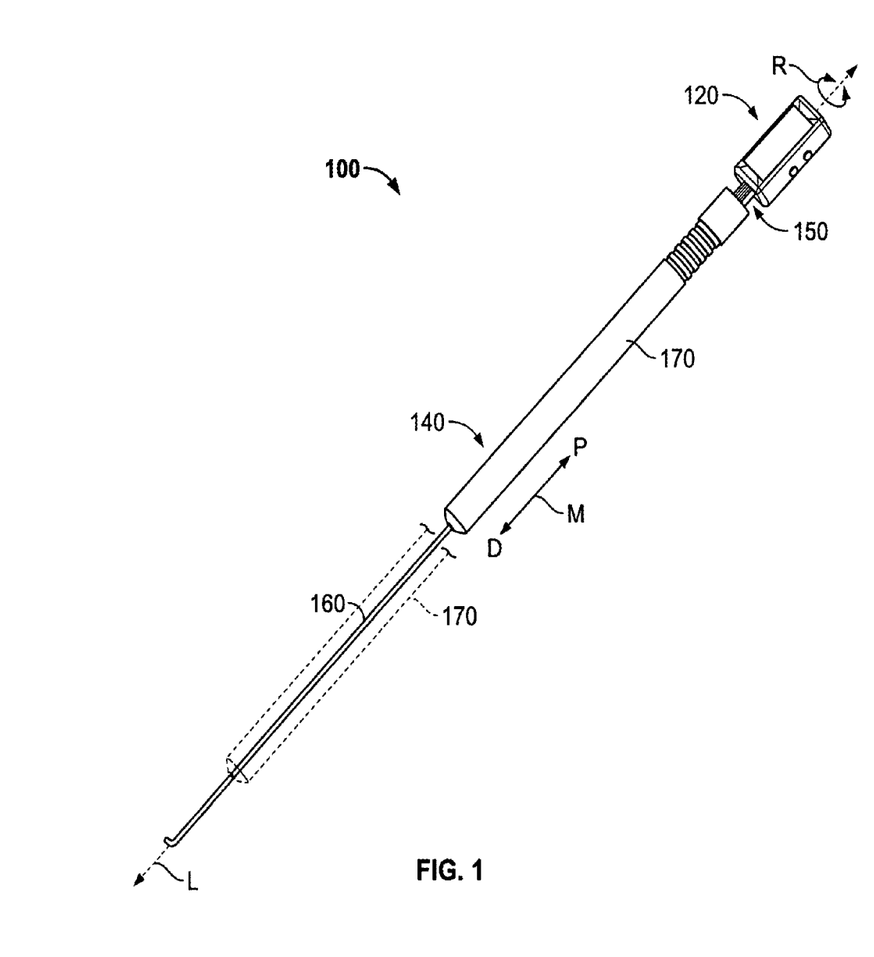
FIG. 1 illustrates a perspective view of an example depth gauge showing example movements of the components.

As shown in FIG. 1, the example depth gauge 100 includes a user interface portion 120 and a shaft portion 140 that extends longitudinally from the user interface portion 120. As can be appreciated, when the depth gauge 100 is in use, the user interface portion 120 is configured proximal to the user such that the user interface portion 120 is generally stationary and readily visible to the user during use of the gauge to take a measurement. Hereinafter, the term proximal will be used to refer to an end or portion of the gauge 100 (or a component thereof) that is near or close to a user of the gauge 100, whereas the term distal will be used to refer to an end or portion of the gauge 100 (or a component thereof) that is distant or furthest away from the user of the gauge 100.

Figure 4:
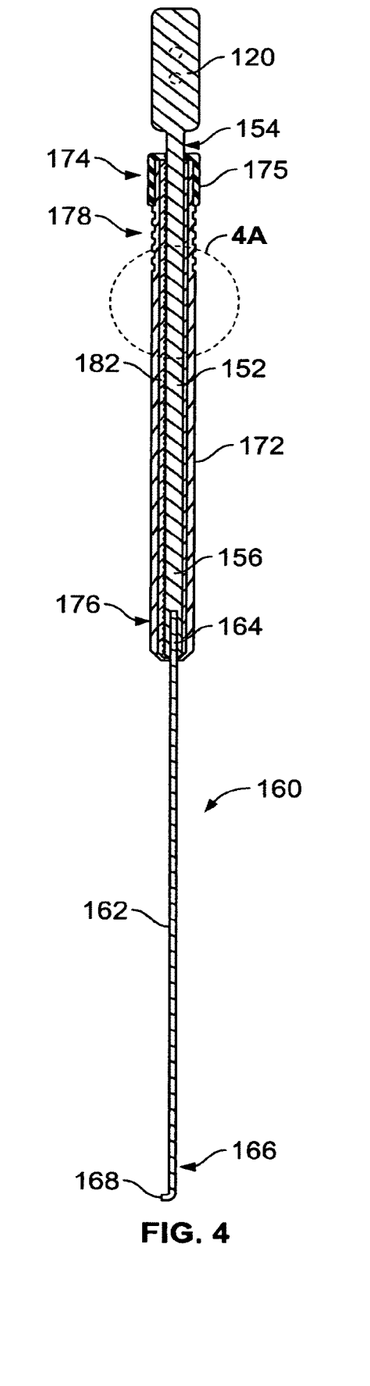
FIG. 4 illustrates a longitudinal cross-sectional view, which is taken through axis L, of the example depth gauge of FIG. 1.

As further shown in FIG. 1, the shaft portion 140 of the example depth gauge 100 includes a reader shaft 150 that extends longitudinally from the housing 130, a needle or probe 160, and an outer sleeve 170. It can be appreciated that the reader shaft 150, the probe 160 and the outer sleeve 170 are coaxial with each other about longitudinal axis labeled "L." Furthermore, as indicated by the double-headed arrow labeled "M" and the dashed-line, distally-positioned outer sleeve 170, it can be appreciated that the outer sleeve 170 is configured to move or translate linearly in the distal direction indicated by "D" and the proximal direction indicated by "P" along axis L. As shown, the reader shaft 150, the outer sleeve 170 and the probe 160 are configured so that the sleeve 170 may translate along a substantial length of the probe 160. That is, the outer sleeve 170 may be substantially similar to the probe 160 (and to the reader shaft 150) in length. In other words and as shown in FIG. 4, a total length of the outer sleeve 170 may be about half the length of the reader shaft 150 and probe 160. Moreover, as indicated by double-headed circular arrow labeled "R," the user interface portion 120 is rotatable about axis L relative to the outer sleeve 170 and vice versa. Although not shown in FIG. 1, in some embodiments of the gauge, an inner sleeve (labeled with reference number 180 and shown in FIGS. 3, 4, 4A, 6 and 6A) may be provided to facilitate relative rotational movement "R" between the outer sleeve 170 and the user interface portion 120 (and reader shaft 150).

Figures 2, 3:
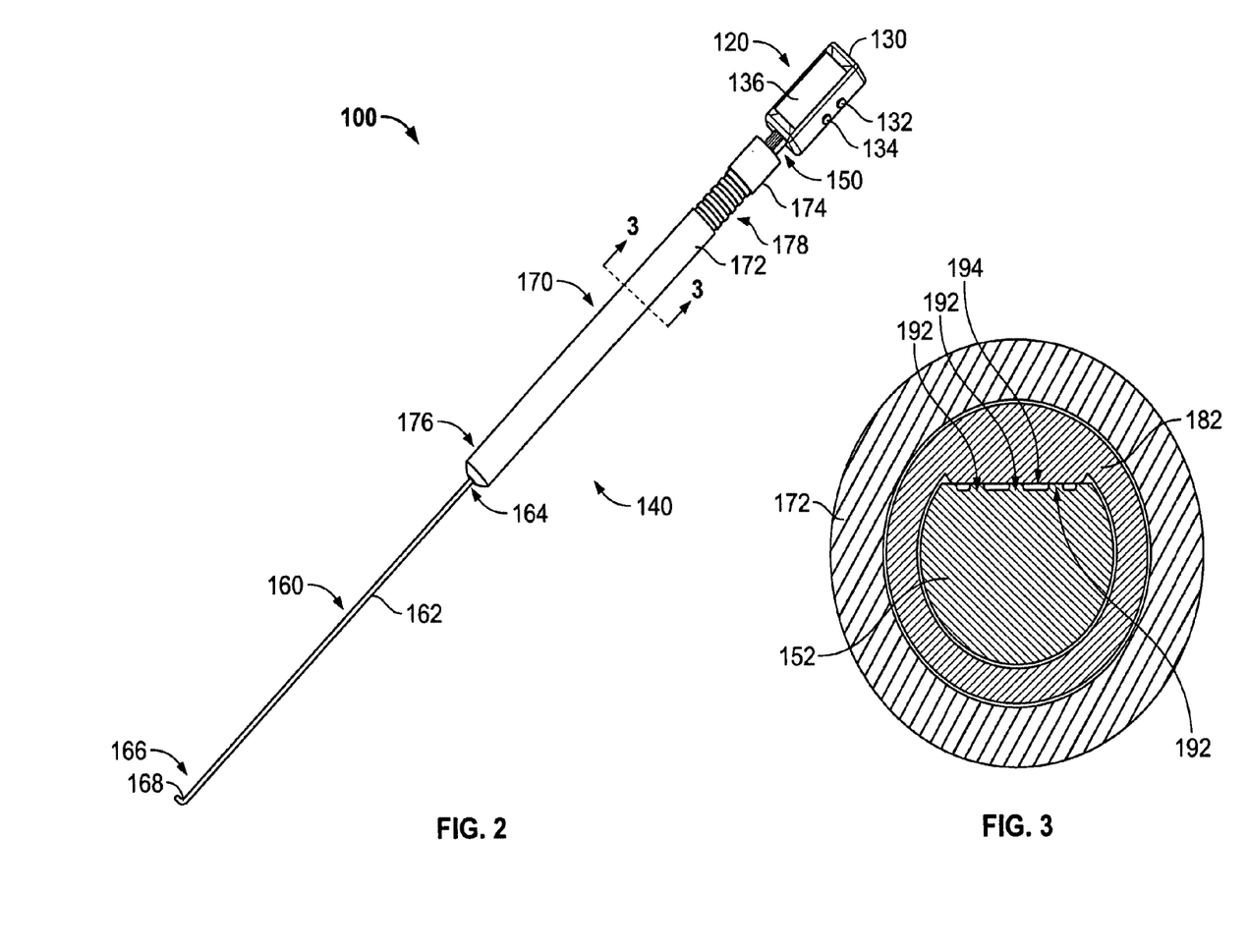
FIG. 2 illustrates another perspective view of the example depth gauge of FIG. 1.
FIG. 3 illustrates a radial cross-sectional view, which is taken through line 3-3, of a shaft portion of the example depth gauge of FIG. 1.

Referring now to FIG. 2 the example gauge 100 is described in further detail. As shown in FIG. 2, the proximally-oriented and generally stationary user interface portion 120 as shown includes a housing 130, one or more actuators 132, 134 on the housing, and a display 136. As can be appreciated, the housing 130 may enclose various components (not shown) of the example depth gauge 100. Control and operational circuitry such as, for example a circuit board such as a PCB with a number of integrated circuit (IC) chips (e.g., a microprocessor, microcontroller, digital signal processor or the like) and other electronic and/or electrical components may be configured within the housing 130. Furthermore, a power source (not shown) such as rechargeable or disposable batteries may be configured in the housing 130 so that the gauge 100 may be used in an un-tethered/un-corded manner. As can be appreciated, the actuators 132, 134 may provide input signals to the internal circuitry of the gauge 100 to, for example control operation of the display 136.

As shown, the housing 130 is generally parallelepiped in shape with a generally rectangular-shaped front side including the display 136, however, the housing 130 and display 136 may be configured otherwise as desired. The one or more actuators 132, 134 may be, for example, buttons, switches, knobs or the like. A user may actuate the actuators 132, 134 for turning the gauge 100 on and off, resetting or zeroing a measurement, changing measurement units (e.g., inches, millimeters, etc.) and the like. Although two actuators 132, 134 are shown, fewer or additional actuators may be provided as desired. The display 136 may be various display devices known in the art such as a liquid crystal display (LCD) panel, a thin film transistor (TFT), a light emitting diode (LED) array and the like. The display 136 may be configured to display a number of alphanumeric indicia for providing the user with a visual indication of a length that is being measured. For example, the display 136 may be configured to show five digits comprising a three digit measurement and a two digit decimal or fractional amount when the example gauge 100 is configured to measure a length or depth in the range of about 10 mm to about 150 mm.

Figure 5:
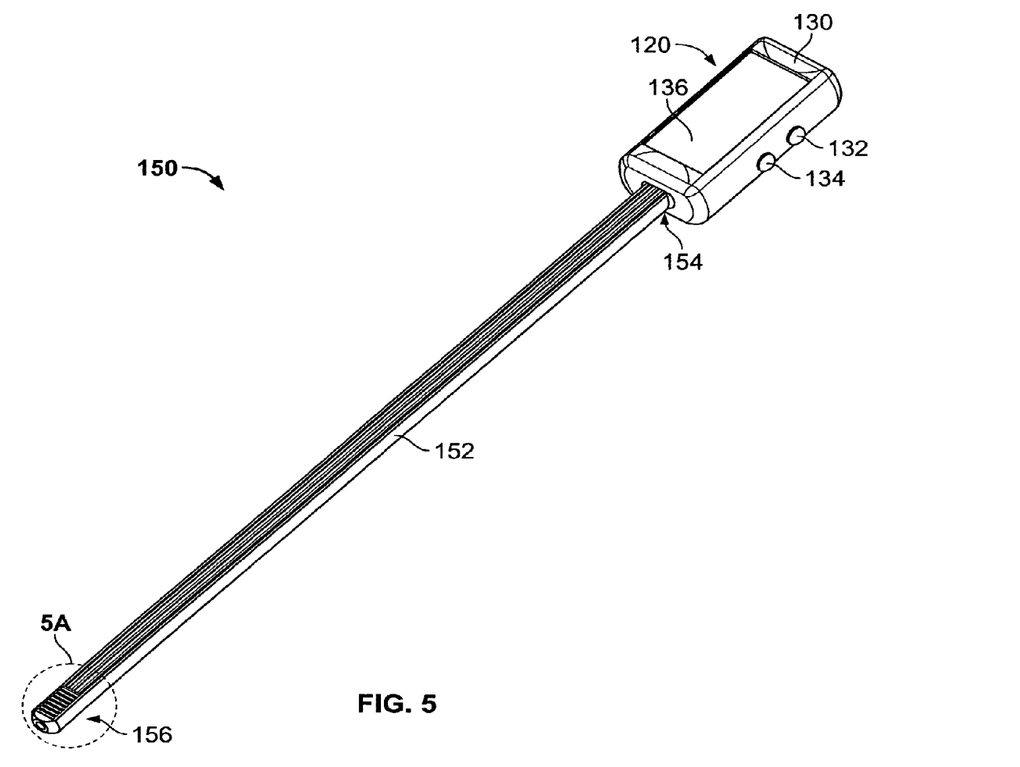
FIG. 5 illustrates a perspective view of a user interface and reader shaft of the example depth gauge of FIG. 1.
Figure 5A:
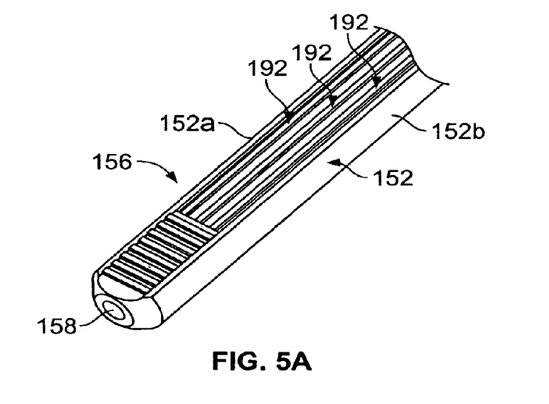
FIG. 5A illustrates a close-up perspective view of a distal end of the reader shaft shown in FIG. 5.

Referring briefly to FIGS. 5 and 5A, the reader shaft 150 is described. As shown in FIG. 5, the reader shaft includes a body portion 152 that extends longitudinally from the housing 130. The body portion 152 includes a proximal end 154 that connects with the housing 130. In some embodiments, the reader shaft 150 and at least a portion of the housing 130 (e.g., a top or bottom half) are integrally or unitarily molded or otherwise formed. A distal end 156 of the reader shaft 150 includes a tip with a longitudinal blind hole 158 (FIG. 5A) which is configured to accept a portion of the probe 160.

In an embodiment, the probe 160 may be fixedly attached to the reader shaft 150 by an adhesive or other mechanical fastening means known in the art, however, in another embodiment the probe 160 may be removably connected with the reader shaft 150 to facilitate cleaning, sterilization, etc. of the gauge 100. For example, the proximal end 164 of the probe 160 may have a substantially similar diameter as the blind hole 158 (FIG. 5A) so that the probe 160 is frictionally coupled with the reader shaft 150 and releasable therefrom. Alternatively, the proximal end 164 of the probe 160 may be threaded and screwed into a complementary threaded hole of the reader shaft 150. According to such an arrangement, the probe 160 may be detached from the reader shaft 150 to allow for separate sterilization of the probe 160. As can be appreciated, in some embodiments the probe 160 may be manufactured of a sufficiently inexpensive material (e.g., plastic) such that the probe 160 may be considered to be disposable. In embodiments of the gauge 100 where the probe 160 may be considered as being disposable, the gauge 100 may be sold or otherwise packaged as a kit with a plurality of probes 160. Additionally, one or more probes 160 may be sold, packaged or otherwise provided separate from the gauge 100.

As shown in FIG. 2, the probe 160 includes a probe body 162 with a proximal end 164 and a distal end 166. The proximal end 164 is connected to the distal end 156 of the reader shaft 150 as best shown in FIG. 4. Furthermore, the distal end 166 includes a tip 168 that is configured to locate a distal surface of the object. As illustrated, the tip 168 may extend outward from the surface of the probe body 162 in a direction that is generally perpendicular to the axis L (FIG. 1). In this way, when the probe 160 is inserted into a hole or bore through an object, the tip 168 is configured to "find purchase" or catch on a distal surface of the object so that a depth or length of the hole or bore can be determined. The tip 168 may alternatively be configured with a hook, barb or the like for mechanically coupling with the distal surface. However, in some embodiments of the gauge 100, the tip 168 may include or be configured with a means for detecting, discriminating, locating or otherwise sensing the distal surface. Such a means may be an optical element, ultrasonic wave emitter, density determination device, etc. for determining or locating a bottom surface of a bore or a distal aperture of a hole. The probe 160 may be a wire or thin rod that is made of a material (e.g., metal such as steel or aluminum) that is sufficiently strong to resist bending or deformation.

As further shown in FIG. 2, the outer sleeve 170 includes a sleeve body 172 with a proximal end 174 and a distal end 176. As can be appreciated, the outer sleeve 170 includes a longitudinally-extending cylindrical bore 179 (FIG. 4A) that extends the entire length of the sleeve body 172 from the proximal end 174 to the distal end 176 so that the outer sleeve 170 is generally configured as a hollow, annular cylinder or tube. In this way, one can appreciate that the outer sleeve 170 is configured for linear translation along axis L with respect to the reader shaft 150 and probe 160. Although the user interface portion 120 may be held generally stationary during use of the gauge 100, by holding the outer sleeve 170 stationary, a user may grasp the user interface portion 120 to move or translate the reader shaft 150 and probe 160 in a generally telescoping manner relative to the outer sleeve 170. As such, the gauge 100 may be employed in a two-handed manner using one hand to hold the user interface portion 120 generally stationary and using the other hand to move the outer sleeve 170, or vice versa. Furthermore, as can be appreciated, the user interface portion 120 (and the connected reader shaft 150) may be rotated (FIG. 1, arrow R) about axis L relative to the outer sleeve 170 such that the display 136 may be oriented for best viewing by the user during use of the gauge 100.

As shown, the sleeve body 172 may include a grip portion 178 to help a user grasp and move the outer sleeve 170. The grip portion 178 as shown includes a plurality of indented circumferential rings, however the grip portion 178 may include knurling or other treatment (e.g., ergonomic finger grooves, a roughened surface and the like) on at least a portion of the outer surface of the sleeve body 172. In some embodiments, the distal end 176 of the sleeve body 172 may include a sealing member such as a washer, grommet or the like so that solid and liquid contaminants are prevented from entering the hollow interior bore of the sleeve body 172. Such a sealing member may be resilient (e.g., made of rubber or the like) so that the tip 168 may pass therethrough for the purposes of, for example, disassembling the gauge 100 for cleaning, sterilization, repair, etc. As previously mentioned, although not shown in FIG. 2, in some embodiments of the gauge, an inner sleeve (labeled with reference number 180 and shown in FIGS. 3, 4, 4A, 6 and 6A) may be provided to facilitate relative translational and/or rotational movement (FIG. 1, arrow R) between the outer sleeve 170 and the user interface portion 120 (and connected reader shaft 150).

In an example use of the illustrated embodiment of gauge 100, a user initially orients the sleeve 170 is in a substantially retracted or proximal position so that the probe 160 is substantially exposed. Next, the user inserts the probe 160 into the hole or bore in an object (as best illustrated in commonly-assigned U.S. patent application Ser. No. 11/081,147 and 11/376,399, which are incorporated herein by reference) until the distal end 166 of the probe 160 extends past the distal surface of the hole or bore. The user then adjusts the probe 160 until the probe tip 168 catches hold on the distal surface. Now, the user moves the outer sleeve 170 distally until the distal end 176 of the sleeve body 172 contacts the proximal surface of the hole or bore. With the outer sleeve 170 moved distally, the user reads the proximally-oriented display 136 to determine the length or depth of the hole or bore. During use, although the user interface portion 120 remains generally stationary relative to the user, to best orient the display 136 for reading, the user may rotate the user interface portion 120 before or after movement of the outer sleeve 170.

As can be appreciated, the gauge 100 may employ any suitable sensing device for determining the length or depth of the hole or bore to be measured. A suitable mechanical, electromechanical or electronic sensor, for example a linear encoder, may employ any one or more of acoustic, ultrasound, capacitive, electric field, inductive, electromagnetic (e.g., Hall effect-type) and optical components for determining relative or absolute distance measurements. Referring now to FIGS. 3, 4, 4A, 5, 5A, 6 and 6A, an example sensor, which measures, senses, discriminates or otherwise determines a length or distance between the probe tip 168 and the distal end 176 of the sleeve body 172, for the gauge 100 is described.

Figure 4A:
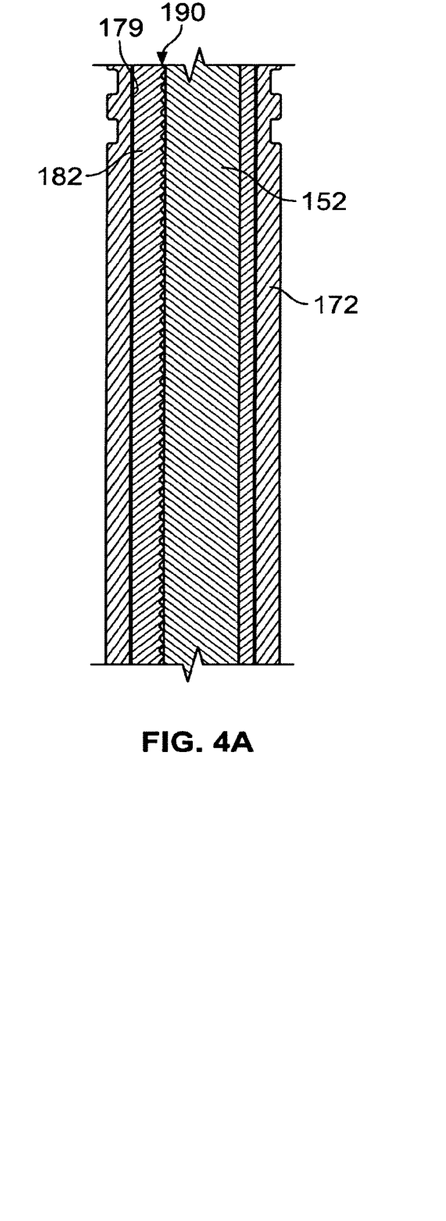
FIG. 4A illustrates a close-up cross-sectional view of a shaft portion of the example depth gauge shown in FIG. 4.

As shown in FIGS. 3, 4 and 4A the shaft portion 140 of the example gauge 100 may further include an inner sleeve 180 that is interposed between the outer sleeve 170 and the reader shaft 150. As can be appreciated from FIG. 4, the inner sleeve 180 is retained in the outer sleeve 170 on account of the substantially closed distal end 176 and a connector or coupling 175 that mates with the outer sleeve 170 at its proximal end 174. The coupling 175 may be a retaining cap that includes a generally cylindrical body configured with internal threads, which engage complementary threads on a surface of the proximal end 174, and a proximal end with a lip or shoulder that extends radially inward (toward axis L) to contact the proximal end 184 of the inner sleeve 180 such that the inner sleeve 180 and outer sleeve 170 translate or move longitudinally along axis L together. By disengaging the coupling 175 from the outer sleeve 170, disassembly of the gauge 100 may be effected.

As shown in FIG. 4A, at least one sensor 190 is interposed between the inner sleeve 180 and the reader shaft 150 to measure at least one of relative, absolute and incremental movement (e.g., distance, speed, etc.) of the outer sleeve 170 with respect to the reader shaft 150 (and vice versa). In one embodiment, the at least one sensor 190 may measure an absolute distance that the outer sleeve 170 is moved relative to a fixed reference point such as, for example the tip 168 of the probe 160 or the proximal end 154 of the reader shaft 150. As can be appreciated, the inner sleeve 180 and the reader shaft 150 are configured to obviate misalignment, decoupling or miscommunication between cooperating first and second sensor elements 192, 194 of the at least one sensor 190 so that a measurement or determination of movement and distance is ensured. In the illustrated embodiment, the inner sleeve 180 and the reader shaft 150 are configured to have complimentary (also known in the art as "keyed") surfaces so that the reader shaft 150 is insertable in the inner sleeve 180 only when properly oriented. However, in other embodiments that do not include the inner sleeve 180, one or more of the reader shaft 150, the outer sleeve 170 and the first and second sensor elements 192, 194 may be configured otherwise to ensure accurate measurements by the at least one sensor 190. The reader shaft 150 and inner sleeve 180 will hereinafter be described in further detail.

As shown in FIGS. 5 and 5A, the body portion 152 of reader shaft 150 is generally hemi- or frusto-cylindrical in shape. As shown in the radial cross-section view of FIG. 3, the body portion 152 of reader shaft 150 has a generally D-shaped cross-section. In FIG. 5A, the body portion 152 is illustrated to include a first surface 152a that is generally planar and a second surface 152b that is generally cylindrical. A first sensor element 192 of the at least one sensor 190 (FIG. 4A) is configured on the generally planar first surface 152a, however, the first sensor element 192 may alternatively be configured on the second surface 152b or even on both surfaces 152a and 152b. The first sensor element 192 may extend along substantially an entire length of the body portion 152. The first sensor element 192 may be an active inductive, capacitive or optical element that is in communication with circuitry (e.g., a controller) of the user interface portion 120. As can be appreciated from FIGS. 3, 5 and 5A, the first sensor element 192 may include one or more longitudinally-extending conductors that are wires, cables or traces on a printed circuit board such as, for example, a flex-circuit or the like. Furthermore, as can be best appreciated from FIG. 5A, the first sensor element 192 may further include a plurality of inductive, capacitive or optical elements that may be coupled with and disposed on the longitudinally-extending conductors. As shown, the plurality of inductive, capacitive or optical elements are configured to be generally perpendicular to the one or more longitudinally-extending conductors, but these elements may be configured otherwise. Although not shown, it can be appreciated that this plurality of inductive, capacitive or optical elements extends along substantially an entire length of the body portion 152. Moreover, although not shown, it can be appreciated that at least one of the plurality of inductive, capacitive or optical elements and the one or more longitudinally-extending conductors may be connected to circuitry of the user interface portion 120. In some instances, the plurality of inductive, capacitive or optical elements may be integral or unitarily formed with the one or more longitudinally-extending conductors.

Figure 6:
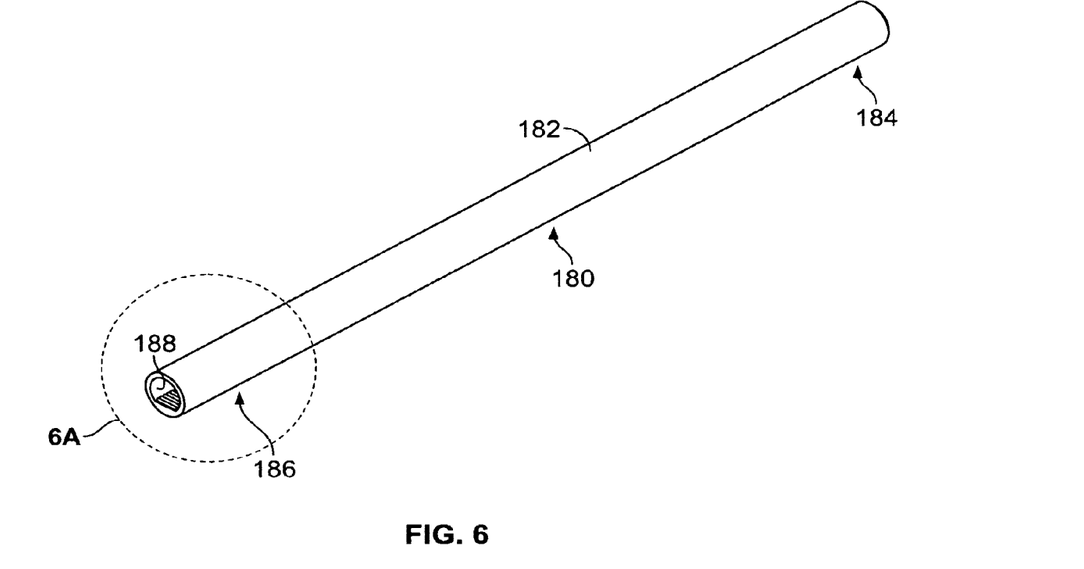
FIG. 6 illustrates a perspective view of an inner sleeve of the example depth gauge of FIG. 1.
Figure 6A:
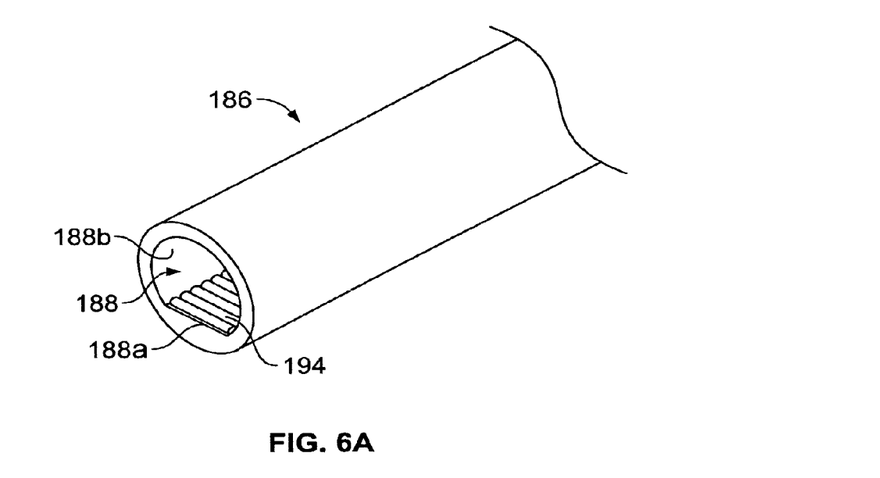
FIG. 6A illustrates a close-up perspective view of a distal end of the inner sleeve shown in FIG. 6.

As shown in FIGS. 6 and 6A, the inner sleeve 180 is somewhat similar to the outer sleeve 170 and includes a longitudinally-extending, hemi- or frusto-cylindrical bore 188 that extends the entire length of the sleeve body 182 from the proximal end 184 to the distal end 186 so that the inner sleeve 180 is generally configured as a hollow cylinder or tube. As can be appreciated from FIG. 3, the bore 188 has a generally D-shaped radial cross-section to substantially correspond with the generally D-shaped radial cross-sectional shape of the reader shaft 150. The length of the sleeve body 182 is substantially similar to the length of the body portion 152 of reader shaft 150 (FIG. 5). As shown in FIG. 6A, the longitudinally-extending, hemi- or frusto-cylindrical bore 188 includes a generally planar inner surface 188a and a generally cylindrical inner surface 188b. The second sensor element 194 of the at least one sensor 190 (FIG. 4A) is configured on the generally planar first surface 188a, however the second sensor element 194 may alternatively be configured on the second surface 188b or even on both surfaces 188a and 188b. Regardless, the second sensor element 194 is configured in the bore 188 to cooperate with the first sensor element 192 on the reader shaft 150. The second sensor element 194 may be a generally passive element such as a permanent magnet, optical element (e.g., indicia) or the like that is configured to cooperate, communicate or otherwise interact with the first sensor element 192. In the illustrated embodiment, when the inner sleeve 180 is aligned with and slidably mated to the reader shaft 150 for longitudinal translation along axis L (FIG. 1), the first and second sensor elements 192, 194 are configured to interact or otherwise communicate with each other. Thus, as the reader shaft 150 translates longitudinally relative to the inner sleeve 180 (or vice versa) the sensor elements 192, 194 also move to provide signals (e.g., pulses, etc.) to the circuitry of the user interface portion 120, which processes the signals and displays a distance measurement on the display 136.

As can be appreciated from FIGS. 3, 5 and 6, the three part construction (i.e., reader shaft 150 with outer sleeve 170 and optional inner sleeve 180) of the shaft portion 140 facilitates independent rotational and translational movement of the outer sleeve 170 relative to the probe 160 (and the user interface portion 120). That is, the inner sleeve 180 is able to translate, but not rotate relative to the reader shaft 150, whereas, the inner sleeve 180 and the reader shaft 150, which are keyed for longitudinal translation, are configured for rotation relative to the outer sleeve 170 (and vice versa). In this way, the user interface portion 120 may be oriented relative to the outer sleeve 170 as desired to facilitate various viewing angles/orientations for the user. During rotation and translation of the outer sleeve 170, the distance measurement or indication being shown on display 136 may vary in a substantially continuous and real-time manner.

Although the first and second sensor elements 192, 194 are shown and described as being configured on the reader shaft 150 and inner sleeve 180 respectively, they may be configured oppositely. Furthermore, although the first and second sensor elements 192, 194 are shown and described as being configured on respective generally planar portions 152a, 188a, the first and second sensor elements 192, 194 may be alternatively configured on the hemi- or frusto-cylindrical shaped portions 152b, 188b. Moreover, although the reader shaft 150 and inner sleeve 180 are shown and described as having complimentary or keyed hemi- or frusto-cylindrical shaped respective body portion 152 and bore 188, the reader shaft 150 and inner sleeve 180 may be configured otherwise with other suitable complimentary or keyed shapes or surfaces known in the art.

Additionally, although the foregoing-described example gauge 100 provides a digital, displayed measurement, the gauge 100 may additionally include a conventional-type scale that provides an absolute scale measurement. For example, a surface of the reader shaft 150 (e.g., the hemi- or frusto-cylindrical shaped portion 152b) may bear a plurality of scale indicia such as numbers and tic marks. In this way, as the outer sleeve 170 is moved longitudinally, the proximal end 174 will coincide with an indicium on the conventional-type scale so that a user can verify or double-check a distance being indicated on the display 136.

Sensors and sensor assemblies are readily available commercially from manufacturers such as Sylvac and Mitutoyo. For example, capacitive and inductive read-head and write-head assemblies are used in digital calipers, such as that made by Mitutoyo America Corporation, 965 Corporate Blvd., Aurora, Ill., and by Guilin Measuring and Cutting Works, 106 Chongxin Road, Guangxi, Guilin 541002, Peoples Republic of China.

In various embodiments the at least one sensor 190 may be in wired or wireless communication with a controller such as a microprocessor, microcontroller, digital signal processor (DSP), field programmable gate array (FPGA) or other controller-type device in order to produce an output to control the display 136. In some embodiments, a signal conditioning circuit may interpose the inductive or capacitive elements of the electronic sensor and the controller-type device to ensuring that correct input current and voltage levels are provided to the various components.

The display may be configured to provide measurements in one or more various metric or English units such as inches, millimeters, and with decimals or fractions thereof. The actuators 132, 134 may facilitate selection of a preferred unit of measurement to be displayed. In some embodiments, the gauge 100 may additionally provide an audible indication of the displayed measurement so that a user need not constantly, intermittently or periodically consult the display. In some embodiments the gauge 100 may be user-calibrated (e.g., by actuating one of the actuators 132, 134). Alternatively, the gauge 100 may be self-calibrating or self-zeroing.

The display may also provide, in addition to a measurement indication, an indication that the reading is not stable, for example, because one or both of the probe 160 and the outer sleeve 170 are not generally stationary relative to one another. Furthermore, in an embodiment, the sensor 190 and accompanying electronics may be shielded from electromagnetic interference, for example, by coating the inside of the housing 130 with a conductive paint containing metal microspheres. Such shielding may be effective in reducing interference from low frequency magnetic fields, or other stray electromagnetic fields.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A digital depth gauge apparatus for measuring a depth of an object, the apparatus comprising:
   an elongated reader shaft that includes a distal end and a proximal end;
   a user interface portion configured at the proximal end of the elongated reader shaft, the user interface portion including a display;
   a probe that couples with and extends from the distal end of the reader shaft, the probe including a tip configured to measure a distal object distance;
   a sleeve member that includes a distal end, the sleeve member being coupled with the elongated reader shaft for relative translational movement with respect to a longitudinal axis through the elongated reader shaft; and
   a sensor interposed between the elongated reader shaft and the sleeve member for measuring relative translational movement between the elongated reader shaft and the sleeve member.

2. The apparatus of claim 1 wherein the user interface portion is generally stationary with respect to the probe when the sleeve member moves with respect to the elongated reader shaft.

3. The apparatus of claim 1 wherein the probe is detachable from the elongated reader shaft.

4. The apparatus of claim 3 wherein the probe is separately sterilizable.

5. The apparatus of claim 3 wherein the probe is disposable.

6. The apparatus of claim 1 wherein the sensor comprises first and second sensor elements, one of the first and second sensor elements being coupled to an outer surface of the elongated reader shaft and the other one of the first and second sensor elements being coupled to an inner surface of the sleeve member.

7. The apparatus of claim 6 further comprising a means for maintaining alignment of the first and second sensor elements.

8. The apparatus of claim 7 wherein the means for maintaining alignment comprises a second sleeve member that is coaxial with the first sleeve member and interposed between the elongated reader shaft and the first sleeve member.

9. The apparatus of claim 8 wherein the elongated reader shaft includes a generally planar longitudinally-extending outer surface on which one of the first and second sensor elements is disposed, and wherein the second sleeve member includes a longitudinally-extending bore having a generally planar surface on which the other one of the first and second sensor elements is disposed.

10. The apparatus of claim 9 wherein the first sleeve member includes a generally cylindrical longitudinally-extending bore, and the second sleeve member includes a generally cylindrical longitudinally-extending outer surface that facilitates relative rotation of the user interface portion with respect to the first sleeve member.

11. The apparatus of claim 1 wherein the sensor is a linear encoder.

12. The apparatus of claim 1 wherein:
   the distal end of the elongated reader shaft includes a blind hole having a first diameter; and
   the probe includes a proximal end opposite the tip, the proximal end having a second diameter substantially similar to the first diameter such that the probe is friction coupled with and removable from the elongated reader shaft.

13. The apparatus of claim 1 wherein the tip of the probe is configured to find purchase on the distal surface.

14. The apparatus of claim 13 wherein the tip of the probe extends generally perpendicularly from a lengthwise body of the probe.

15. The apparatus of claim 1 wherein the tip of the probe comprises a second sensor for detecting the distal surface.

* * * * *